United States Patent [19]

David et al.

[11] 4,151,036

[45] Apr. 24, 1979

[54] APPARATUS FOR THE APPLICATION OF A FABRIC COVERING THE FRAME OF A LAMPSHADE

[75] Inventors: Paul M. David, St-Marcellin; Bernard H. E. Rey, St-Sauveur, both of France

[73] Assignee: Redalum, Societe Anonyme, Teche, France

[21] Appl. No.: 841,847

[22] Filed: Oct. 13, 1977

[30] Foreign Application Priority Data

Oct. 13, 1976 [FR] France ............................... 76 31315

[51] Int. Cl.[2] ............................................ B29C 17/02

[52] U.S. Cl. ...................................... 156/475; 156/494

[58] Field of Search ............... 156/213, 229, 475, 494, 156/160, 165, 161, 162; 254/51; 38/102.1, 102.3, 102.9; 140/108, 109; 29/448, 148.4 D, 728; 262/358

[56] References Cited

U.S. PATENT DOCUMENTS

| | | | |
|---|---|---|---|
| 966,929 | 8/1910 | Lang | 38/102.2 |
| 1,016,463 | 2/1912 | Wilkins | 38/102.2 |
| 1,357,737 | 11/1920 | Solaini | 38/102.2 |
| 1,577,664 | 3/1926 | Tew | 156/494 |
| 2,224,340 | 12/1940 | Dent | 156/229 |
| 2,844,172 | 7/1958 | Harmon | 140/109 |
| 3,974,012 | 8/1974 | Hogarth | 156/494 |

FOREIGN PATENT DOCUMENTS 822205 12/1937 France.

*Primary Examiner*—Jerome W. Massie
*Attorney, Agent, or Firm*—Karl F. Ross

[57] ABSTRACT

A fabric covering is applied to the body or frame of a lampshade, which frame has a lower circle (ring) and an upper circle (ring) disposed with a common axis and connected by a plurality of angularly spaced struts. The two ends of the fabric covering are held in place by a pair of axially spaced members and these members are urged apart to stretch the fabric against the frame. The fabric is then glued to the elements of the frame and excess fabric is cut away above and below the frame.

18 Claims, 10 Drawing Figures

APPARATUS FOR THE APPLICATION OF A FABRIC COVERING THE FRAME OF A LAMPSHADE

FIELD OF THE INVENTION

The present invention relates to an apparatus for securing a fabric covering to the body or frame of a lampshade and, more particularly, to the production of a lampshade in which a fabric covering is stretched onto and secured to a frame which comprises at least one lower circular element, an upper circular element disposed along the axis of the first circular element, and a plurality of angularly spaced struts or armatures connecting these circular elements.

BACKGROUND OF THE INVENTION

A lampshade generally comprises a body or carcass (hereinafter referred to as a "frame") which constitutes a support for a fabric covering stretched against the elements of the frame and secured thereto. The frame generally comprises a lower circular element (lower circle), an upper circular element whose axis coincides with that of the lower circular element, and a plurality of angularly equispaced struts or armatures interconnecting these circular elements. In addition, the lampshade may be provided with additional struts extending inwardly from, for example, the upper circle and terminating, within the body of the lampshade, in an annular element by which the shade is mounted upon the lamp.

The principal difficulty encountered heretofore in the application of a fabric covering to such a body or frame has involved the stretching of the fabric against the element of the frame.

In one prior-art system, the hems at the upper and lower ends of the fabric covering are traversed by elastic members and these elastic members draw the fabric inwardly at the upper and lower ends against the upper and lower circles. The body is mounted on a support comprising a pair of axially spaced disks. This process, while permitting a certain degree of mechanization of the operation of stretching the fabric has several disadvantages. Firstly, the elastic can only be used for about a dozen times and the mounting of the elastic is relatively time consuming. Secondly, the stretching requires drawing the fabric first inwardly at the lower circle and then drawing the fabric inwardly at the upper circle, operations which are complex and also require considerable time.

Thirdly, the upper circle of the frame is frequently deformed by the stretching forces applied to the fabric and the deformations are especially pronounced when the lampshade is of large diameter.

OBJECTS OF THE INVENTION

It is the principal object of the present invention to provide an improved apparatus for avoiding the aforementioned drawbacks and applying a uniform and high degree of stretch to the fabric of a lampshade against the frame or carcass thereof without deforming the latter.

Still another object of the invention is to provide an improved apparatus for the stretching of a fabric covering about a lampshade body or frame of the character described which greatly speeds up the assembly and attachment operations and hence is of high economy.

Still another object of the invention is to provide an apparatus for the purposes described which is rapidly operating, highly efficient and relatively simple.

SUMMARY OF THE INVENTION

According to the method aspects of the present invention, the process for stretching a fabric covering or jacket, previously formed into the general shape of the lampshade, upon a carcass or frame of the type described, comprises securing the upper and lower edges or ends of the fabric on a pair of mechanical elements adapted to be spread apart, spreading apart these elements, at least by displacing one of them and thereby entraining at least one of the circles of the frame to stretch the fabric onto the frame elements, securing the stretched fabric at least to the lower and upper circles of the frame and cutting off excess fabric above and below the frame. To this end, the upper and lower edges of the fabric covering are secured to the aforementioned mechanically separable members above and below the upper and lower circles of the frame respectively.

This process has several significant advantages over the prior-art process described above. Firstly, the fabric can be stretched against the carcass or frame in only one direction, thereby completely eliminating all folds or creases and speeding up the stretching process. Secondly, where the mechanical elements also carry one of the circles of the frame, preferably the upper circle, there is little if any deformation and, in most cases, even a rectification of the shape of the engaged circle where the latter is slightly bent befor the application of the fabric. The method has been found to provide a highly uniform stretching which is rapid and suitable for all types of fabrics, guaranteeing a constant quality and a high degree of reproducibility.

In a first embodiment of the process of the present invention, the upper and lower edges of the fabric sleeve are provided with hems through which cables or similar flexible elements are threaded, these cables engaging the mechanical members which are spread apart to stretch the fabric. The cables can be reused indefinitely and need not be elastic members. Furthermore, the cables can be threaded into the hems of the fabric sleeve relatively rapidly. However, where the threading of the cables takes up time and is undesirable, as may be the case in certain instances, the second embodiment of the process can be used.

In the second embodiment of the process of this invention, the upper and lower edges of the fabric sleeve are engaged by clamping or pincer action between the mechanical elements and a pair of members cooperating therewith, e.g. by wedge action. In this case, the mechanical elements or members can be elastically compressible.

The attachment of the fabric to the lower and upper circles of the frame, after the fabric sleeve has been stretched, is preferably effected by introducing a highly flowable cyanoacrylate adhesive between the fabric and the upper and lower circles, the glue or adhesive being drawn by capillarity into the fabric and the contacting region between the fabric and the frame. Cyanoacrylate adhesives of this type, e.g. Eastman 910, set in several seconds and bond to synthetic-resin (plastic) materials, noncoated metal, metal coated with a synthetic-resin pair, lacquer or an epoxy resin, and to practically all fabrics. The excess of fabric above and below the upper and lower circles, respectively, is removed at the gluing level with a severing tool.

The apparatus of the present invention comprises a horizontal supporting arm formed at one of its ends with a circular annular member upon which the lower circle of the lampshade frame is disposed, a shaft axially shiftable on this end of the arm relative to the circular member, i.e. slidably mounted for axial displacement relative to this member, carrying the upper member engageable with the upper circle of the frame. Means is provided to axially shift this shaft and slide relative to the first-mentioned member. According to a feature of the invention, the first member can be a peripherally grooved pulley, the groove serving to receive the lower hem or edge of the fabric sleeve.

When the method of the invention is carried out using a cable to secure the edges of the fabric sleeve to relatively displaceable members, the cable advantageously is received in the groove of this pulley. The other cable, i.e. the cable at the upper end of the lampshade sleeve, can engage upon a plurality of fork-shaped pivotal cleats which receive, in the respective crotches, the struts of the frame beneath the upper circle. The cleats can extend radially from a cleat support and can be pivotally mounted upon the latter to enable the upper member constituted by the cleat supports and the pivotal cleats to be inserted through the upper circle and beneath the latter.

Since the fabric is held in place at its upper and lower edges by means of these cables, centering and perfect distribution of the fabric to the frame is ensured. The cleat support, which carries the upper circle of the frame, ensures a uniform distribution of the forces applied axially to this support to the upper circle at each of the struts and hence allows a high degree of stretching of the fabric with deformation of the upper circle. The locking of one of the cables above the cleat support permits coverage of the upper circle by the fabric with a large surface of contact between them, thereby facilitating the gluing and the production of a high-quality structure because the upper circle is surrounded to a large extent by the fabric.

The support arm is advantageously mounted pivotally for angular displacement about a horizontal axis. The mounting can be effected at the end of the arm remote from that which carries the shaft and the grooved pulley, locking means being provided at this remote extremity to secure the support arm in a plurality of predetermined angular positions, generally at least 180° apart. Thus the gluing of the fabric to the frame can be effected first with the lampshade upright and then with the lampshade inverted, thereby improving the distribution of the glue and facilitating its application.

Preferably, the support arm is provided at its first extremity with a split sleeve traversed by a bushing which supports the grooved pulley and which is itself traversed by the slidably mounted shaft or a slider carrying same. The split sleeve can constitute means for locking the bushing and the pulley against rotation. The locked position of the sleeve can be maintained during the stretching operation but then can be released to permit free rotation of the frame and the sleeve to facilitate the application of the glue along the peripheries of the lower and upper circles of the frame.

When a tubular slide is used, this slide can be keyed to the sleeve to prevent relative rotation of the slide and the sleeve, the slide being traversed by the shaft carrying the cleat support mentioned previously. The slide is connected to the means for axially displacing the shaft. The adjustable connection between the shaft and the sleeve permits a variation in the spacing between the upper and lower members which are shiftable axially apart to accommodate lampshades of different height. This adjustable connection can be effected by means of a pin which can engage in a selected one of a multiplicity of axially spaced holes formed in the shaft.

According to yet another feature of the invention, the cleat support comprises, on the one hand, a central member keyed to the shaft to ensure joint rotation of the cleat support and the shaft and, on the other hand, a plurality of cleats pivotally mounted upon the cleat support. The cleats extend radially and are provided in a number of equal to the number of struts or armatures which connect the lower and upper circles of the frame. Each cleat is provided at its free (nonpivoted) end with a fork having two shanks adapted to support the upper circle of the frame and separated by a crotch or gap adapted to receive one of the armatures or struts thereof.

All of the shanks are machined so that at least their upper surfaces lie precisely in the same plane perpendicular to the axis of the shaft when the cleats are not tilted upwardly. When, however, the cleats are swung upwardly, the assembly of cleats and cleat support constituting the upper member, can be inserted readily through the upper circle of the frame and vice versa so that the latter can be readily mounted on the apparatus or removed therefrom.

When the apparatus is used for carrying out the second embodiment of the process of the present invention, circular means is provided along the outer face of the upper and lower edges of the fabric sleeve to clamp the latter edges against the upper and lower members. These outer circular elements can be rigid while the inner members are elastically deformable or vice versa.

It has been found to be advantageous to make the device selfclamping with respect to the fabric. This can be achieved in various ways. In general terms, the cooperating clamping members are provided with a wedge-shaped profile to lock the fabric in place upon the application of the axial stretching force.

According to one feature of the invention, the clamping means comprises an inner elastic member, preferably in the form of a disk whose periphery has a frustoconical configuration and diverges toward the direction in which the fabric is to be stretched. The rigid external member can have an annular configuration. This external member can be of circular or trapezoidal cross section. According to another feature of the invention, the circular member for clamping the fabric comprises a rigid inner member in the form of a pulley having a trapezoidal groove along its periphery while the elastic member is disposed externally and is an annulus of circular cross section to be received within the trapezoidal groove.

A ferrule, displaceable axially and adapted to partially block the trapezoidal groove, can surround the pulley so as to prevent withdrawal of the circular-cross section elastic member.

In a third variant of the clamping means, the inner member is rigid and of a circular or annular configuration, being provided with a peripheral groove having a step or shoulder, the elastic member, disposed externally, being an annulus of elongated-cross section adapted to be received in this groove and to bear against this shoulder or to be received in the step of the groove.

In a fourth variant of the clamping configuration, the circular clamping means comprises a rigid inner member in the form of a pulley having an outwardly open trapezoidal peripheral groove while the deformable external member is a belt of trapezoidal cross section adapted to be received in the trapezoidal groove. The belt is provided with means for closing the ends thereof and retaining same in the trapezoidal groove.

In a fifth variant, the circular means for clamping the fabric comprises a rigid internal member in the form of a pulley having a V groove along its periphery while the external deformable member is a cable adapted to be received in the V groove. The cable is provided with means for closing its ends and retaining same in the V-shaped groove.

BRIEF DESCRIPTION OF THE DRAWING

The above and other objects, features and advantages of the present invention will now become more readily apparent from the following description, reference being made to the accompanying drawing in which.

SPECIFIC DESCRIPTION

Figure 1:
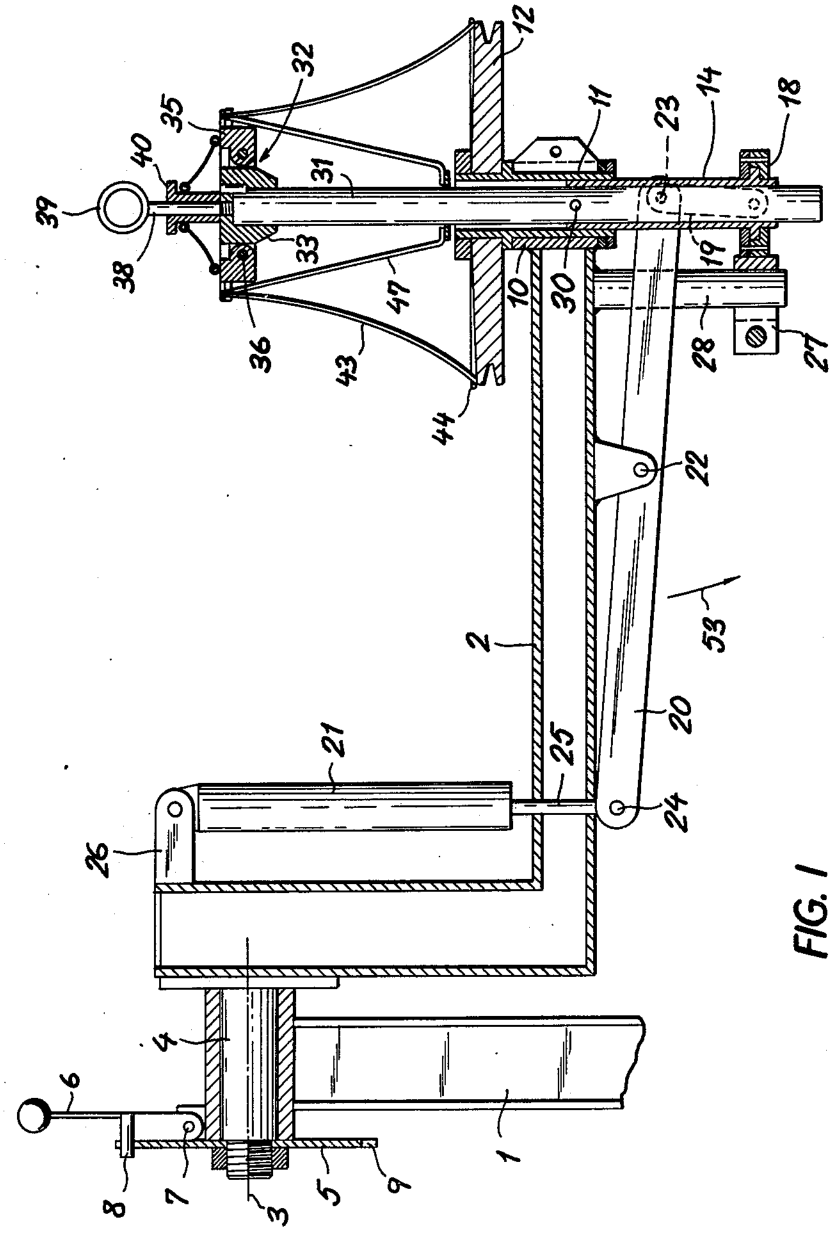
FIG. 1 is a somewhat diagrammatic vertical cross-sectional view, partially in elevation, of an apparatus for carrying out the process of the present invention.
Figure 1A:
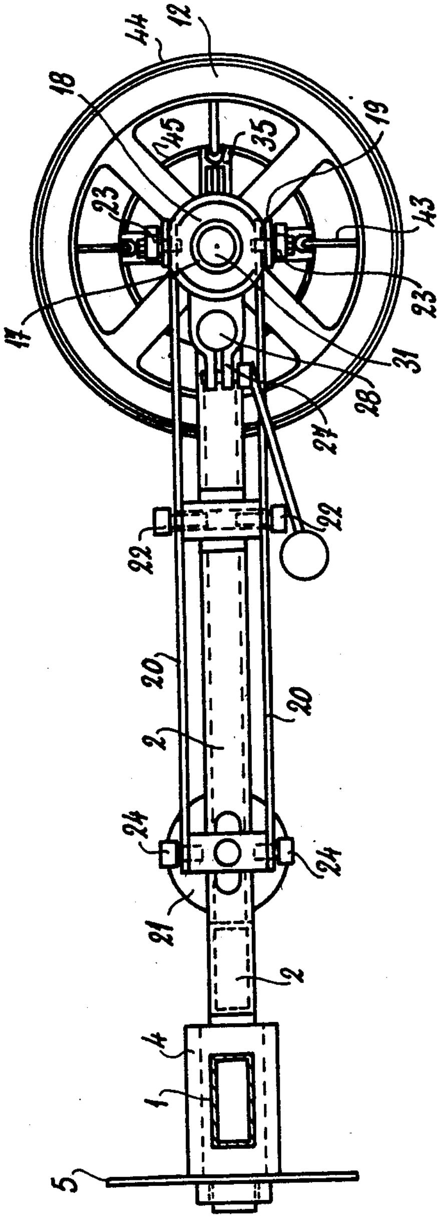
FIG. 1A is a bottom view of FIG. 1.

The apparatus shown in FIGS. 1 and 1A comprises a tripod of adjustable height, visible partially at 1 and a horizontal support arm 2 pivotally mounted at the top of the tripod 1 for angular displacement about a horizontal axis 3 to permit the device to occupy different angular positions as will be apparent hereinafter. To this end, the arm 2 is provided with a pivot pin 4 which is rigid with an angularly bent portion of the arm and received in a sleeve carried by the tripod 1. The pivot pin 4 also carries a disk 5 which is fixed to the pin and cooperates with a locking lever 6 swingable about a fixed axis 7 on the fulcrum. The lever 6 has a finger 8 which can be received in a selected one of a plurality of notches 9 formed in the periphery of the disk 5 to retain the arm 2 in its selected angular positions including at least the position shown in FIG. 1 and a position 180° inverted therefrom with the lampshade turned over.

At the unsupported extremity of the arm 2, there is a welded a split sleeve 10 whose axis is perpendicular to the horizontal axis 3. The split sleeve 10 is traversed by a bushing 11 which carries a peripherally grooved pulley 12. The split sleeve 10, which can be drawn tightly about the bushing 11, constitutes means for locking the bushing 11 against rotation. Naturally, by locking the bushing 11 against rotation, all elements which are angularly coupled to this bushing are also prevented from rotating.

Figure 2:
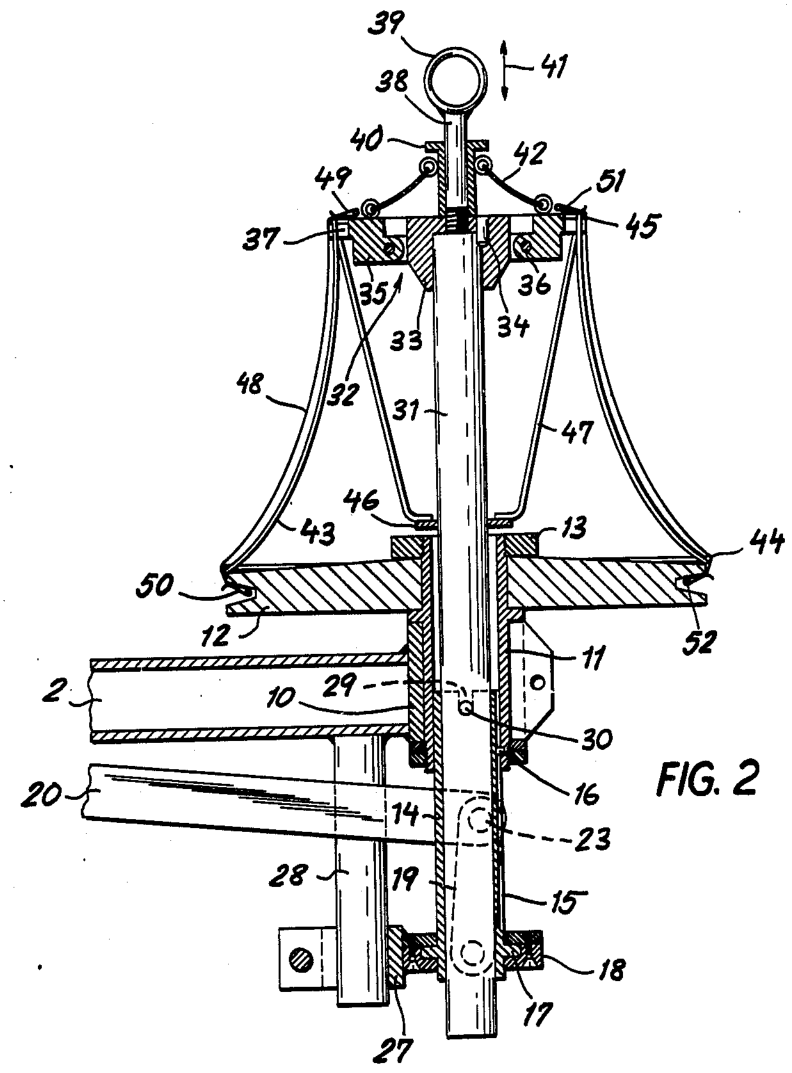
FIG. 2 is a detail view, drawn to an enlarged scale, showing the portion of the apparatus of FIG. 1 for supporting the lampshade frame according to a first embodiment of the invention.

As has been shown in somewhat greater detail in FIG. 2, the bushing 11 has an upper end extending in to the pulley 12 and threaded to enable a nut to be tightened upon this bushing to clamp the pulley 12 to the latter. This screw-thread arrangement of the nut 13 and the bushing 11 permits removal and replacement of the peripherally grooved pulley 12 by other pulleys of larger or smaller diameter, corresponding to the different sizes of the lower circle of the lampshade.

The bushing 11 is traversed by a tubular slide 14. As is also apparent from FIG. 2, the tubular slide 14 is provided with a longitudinal groove 15 engaged by a key 16 rigid with the bushing 11 and thus rotatably entraining the bushing with the slide 14 and vice versa.

At its end projecting downwardly from the sleeve 11, the slide 14 is formed with a collar 17 surrounded by a double bronze bearing 18 connected by a link 19 and a lever 20 to a pneumatic cylinder 21. The double bronze bearing 18 permits the slide 14 to rotate about its axis while being axially entrained by the bearing. The lever 20 is swingable about a fulcrum 22 disposed at an intermediate portion of the arm 2 and has at its extremity remote from the articulated link 19, an end 24 which is pivotally connected to the rod 25 of the pneumatic cylinder 21. The latter is, in turn, swingable on a lug 26 welded to the support arm 2 in the region of the pivot 4 of the latter. The other end 23 of the lever 21 is pivotally connected to the link 19 at one end of the latter, the other end of the link 19 being pivotally connected to the double bearing 18 previously described.

The double bearing 18 is also connected to a second split sleeve 27 transversed by a bar 28 welded to the arm 2 and extending parallel to the axis of the sleeve 10. When the split sleeve 27 is clamped upon the rod 28, the axial displacement of the slide 14 is prevented and relative movement of the slide 14 and the bushing 11 is precluded.

At its end opposite the collar 17, the slide 14 is provided with one or two notches 29 receiving a transverse pin 30 connected to a shaft 31 which traverses the sleeve 11 and the slide 14. The shaft 31 is provided with a series of holes, for example, fifteen regularly spaced holes separated by center-to-center distances of 15 mm, permitting selection of the position of the pin 30 and hence the relative positions of the shaft 31 and the slide 14 to adapt the apparatus to different lampshade heights.

Figure 3:
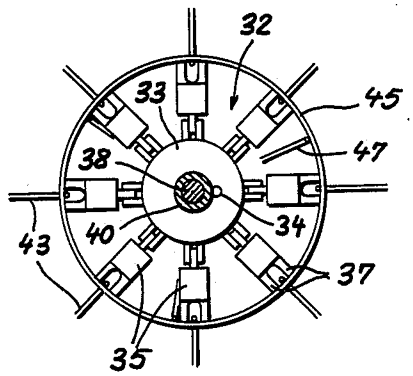
FIG. 3 is a fragmentary-plan view from above showing the cleat support and the cleats pivotally mountable thereon.

The shaft 31 is provided at its upper extremity with a removable cleat support represented generally at 32 and whose structure is best seen from FIGS. 2 and 3.

This cleat support 32 comprises a central piece or hub 33 which is removably fixed to the upper end of the shaft 31 and is keyed thereto at 34. As a result, the hub 33 and the shaft 31 are jointly rotatable. The hub 33 is provided, along its periphery, with a multiplicity of angularly equispaced and radially extending cleats 35 which are each pivotally mounted on axes 36 perpendicular to the axis of shaft 31. Each cleat 35 is formed at its extremity with a pair of shanks 37 separated by a notch or groove, thereby imparting to the free ends of the cleats the configuration of a fork.

A threaded rod 38 is formed at its upper end with an engaging eye 39 and is fixed on the hub 33 of the cleat support 32. This threaded rod can be screwed into the shaft 31 along the axis thereof to secure the cleat-support assembly in place. A sleeve 40 is mounted slidably on the rod 38 and can be displaced in the direction represented by the arrow 41. The sleeve 40 is provided with a plurality of angularly equispaced eyes connected flexibly by small cables 42 with respective eyes fixed to each of the cleats 35. This arrangement permits, upon elevation of the sleeve 40, the simultaneous upward and inward tilt of all of the cleats 35, by pivoting them about their axes 36, to enable the cleat-support assembly to be inserted into an upper circle of the frame. When the cables 42 are released, the cleats 35 fall into the position shown in FIG. 2 in which they are held by abutments, not shown.

The cleats 35 are provided in number equal to the number of struts 43 which connect the lower circle 44 and the upper circle 45 of the lampshade frame. The angular distribution of the cleats about the hub 33 corresponds to that of the struts 43 about the axis of the lampshade.

In operation, the pulley 12 of a diameter corresponding to the diameter of the lower circle 44 of the lampshade frame is mounted on the bushing 11 and the height of the shaft 31 is adjusted, by means previously described, to adapt the apparatus to the height of the frame involved.

The frame is then placed on the pulley 12 in such manner that its lower circle 44 rests on the periphery of this pulley. The central ring 46, whereby the lampshade is connected to the lamp ultimately, passes over the shaft 31.

Thereafter, the cleat support 32 is mounted upon the shaft 31 and the frame is disposed upon the cleats 35. To this end, the cleats 35 are tilted upwardly and then swung downwardly such that the flanks 37 lie beneath the upper circle 45 and receive the struts 43 in the notches between these shanks or flanks 37. Thus these shanks support the upper circle 45. It should be noted that, in this position, the struts 47 of the frame, to which the central ring 46 is connected, lie close to certain of the cleats 35 and thus these struts should lie between the cleats as shown in FIG. 3 with respect to a frame having 8 struts 43 and three struts 47.

A fabric sleeve 48, of appropriate dimensions and shape, is disposed around the frame. This sleeve is provided at its top and at its base with hems indicated respectively at 49 and 50. A cable 51 is threaded through the upper hem 49 by an opening for this purpose and is connected to hold the upper hem against the eyes of the cleats 35. The cable 51 can be maintained tight by a device for holding its ends together (e.g. a conventional cable clamp) and carried by one of the ends of the cable, this device having not been illustrated in the drawing. Another cable 52 is threaded into the lower hem 50 through an opening provided for this purpose and is connected at its ends by similar locking means, not shown, to retain the fabric in the base of the groove of pulley 12.

The apparatus, thus prepared, is ready for operation to effect the stretching of the fabric sleeve 48. The pneumatic cylinder 21 is activated and swings the lever 20 about the fulcrum 22 in the sense represented by the arrow 53 in FIG. 1. This lever, via the link 19, the double bearing 18 and the slide 14 displaces the shaft 31 connected with the slide 14 by the pin 30 and lifts the latter to raise the cleat support 32 and the entire body of the lampshade. The fabric, held in the groove of the lower pulley 12, is thereby stretched.

The compressed air fed to the cylinder 21 is controlled by a manometer and pressure-relief valve arrangement not shown to develop the appropriate tension upon the fabric corresponding to the various types of fabric and lampshades involved.

When the fabric is sufficiently stretched, the split sleeve 27 is clamped to fix the slide 14 against axial displacement relative to the bushing 11, thereby maintaining the upper member, namely, the cleat support 32 at a fixed spacing from the lower member, namely, the pulley 12.

When the fabric is locked in its stretched position, it is glued along the lower circle 44 of the frame by introducing a highly flowable adhesive, preferably a rapidly acting cyanoacrylate cement of the type previously described, the cement being drawn by capillarity onto the interference between the fabric and the lower ring. So that the glue can be distributed over the entire periphery of the ring 44, the operator can rotate the mechanism after release of the split sleeve 10.

The disk 5 is thereupon unlatched and the entire assembly is rotated through 180° about the horizontal axis 3 and latched in its new position via the finger 8. In this case, the lampshade is inverted and the ring 45 of the frame becomes the lower circle and the cement is applied thereto by the same process as has been previously described.

The disk 5 is again unlatched and the assembly rotated into its original position. The excess fabric is cut from the sleeve at the level of the glue or cement, on the top and on the bottom with the aid of a slicing tool such as a razor blade or the like.

The operator then by hand lifts the lampshade through several centimeters and draws the sleeve 40 upwardly to raise all of the cleats 35. The support 32 is then removed from the shaft 31, the cleats in their erect position permitting the member 32 to pass through the upper ring 45. Finally, the lampshade is put aside and the cables 51 and 52 are removed from the fabric scraps. The apparatus is thus ready for a new cycle.

Figure 4:
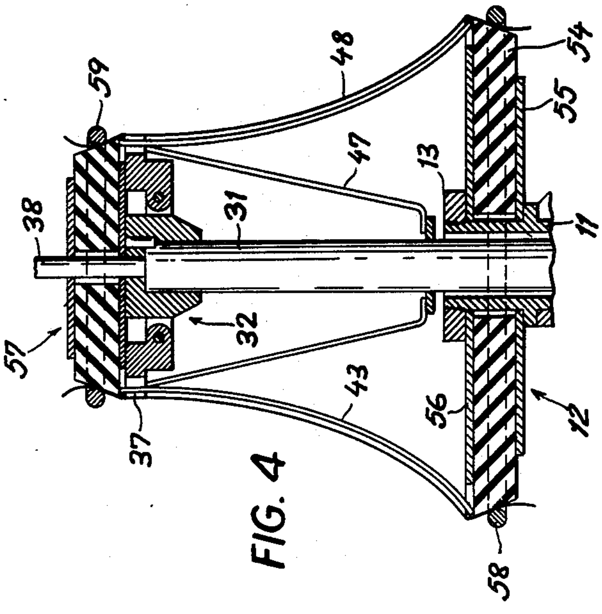
FIG. 4 is a view partially in section of the region corresponding to the portion of the apparatus shown in FIG. 1, but illustrating another embodiment of the invention.

FIG. 4 shows a device according to the invention in which the parts supporting the lampshade frame are not fundamentally different from those previously described and include the bushing 11 which carries a circular element 12 fixed by means of a nut 13 on the bushing 11. The shaft 31 extends through the sleeve as previously described and is, in this embodiment, provided at its upper end with a cleat support 32 which is removably affixed to the shaft 31 a as has already been described.

Figure 5:
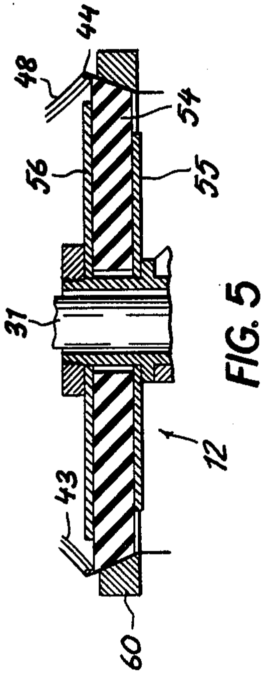

In this embodiment, as in the case of FIG. 5, the circular member 12 is constituted by a disk 54 of an elastic material, for example, rubber, mounted between two rigid flanges to maintain the rubber disk in place. These flanges 55 and 56 are composed of metal and are traversed by the bushing 11. The periphery of the disk 54 has a frustoconical configuration, converging away from the cleat support 32. The upper face of the disk thus has a diameter greater than that of its lower face.

A similar circular member 57 is disposed above the cleat support 32 and has rigid flanges through which the rod 38 passes. However, the frustoconical periphery of the upper disk of elastic material is such that the upper face of the disk has a diameter less than that of the lower face thereof.

As described previously, the lampshade frame is placed upon the lower circular member 12 so that its lower ring 44 rests upon the periphery of the disk 54 while its upper ring 45 is supported on the pivotal cleats 35. Each strut or armature 43 is disposed between the two shanks 37 of the respective cleat. The mounting ring 46, of course, which is connected to the upper ring 45 by the struts 47, surrounds the shaft 31.

In order to retain the fabric sleeve 48 on the upper and lower members 12 and 57, respectively, various clamping arrangements can be considered.

In the case of FIG. 4, the clamping means includes a pair of rigid rings 58 and 59 of circular cross section, respectively cooperating with the elastic disks 54 and 57.

The lower ring 58 clamps the lower edge of the fabric 48 between itself and the frustoconical surface of the elastic disk 54. Similarly, the upper ring 59 clamps the upper excess portion of the fabric 48 against the disk 57. The two ends of the fabric are thus fixed circularly and the stretching of the fabric is effected in the manner previously described.

More specifically, the shaft 31 is displaced relative to the bushing 11 in a manner such as to raise the cleat support 32, entraining therewith the circular member 57 and the fabric 48 engaged thereby.

In the embodiment of FIG. 5, in which only the lower circular element 12 has been shown, the rigid ring 60 serving to clamp the lower margin of the fabric, has a trapezoidal section with an inner frustoconical surface whose convergence corresponds to that of the periphery of the elastic disk 54. The fabric 48 is thus gripped between two frustoconical surfaces and the stretching operation is not otherwise modified.

FIGS. 6–9 show other embodiments of the clamping means for the fabric, the principle being applicable to the upper or lower clamping means although, in each case, it has been illustrated for the lower clamping members.

In these embodiments, the inner member 12 formed as a peripherally grooved pulley, is rigid and inelastic.

Figures 6, 7, 8, 9:
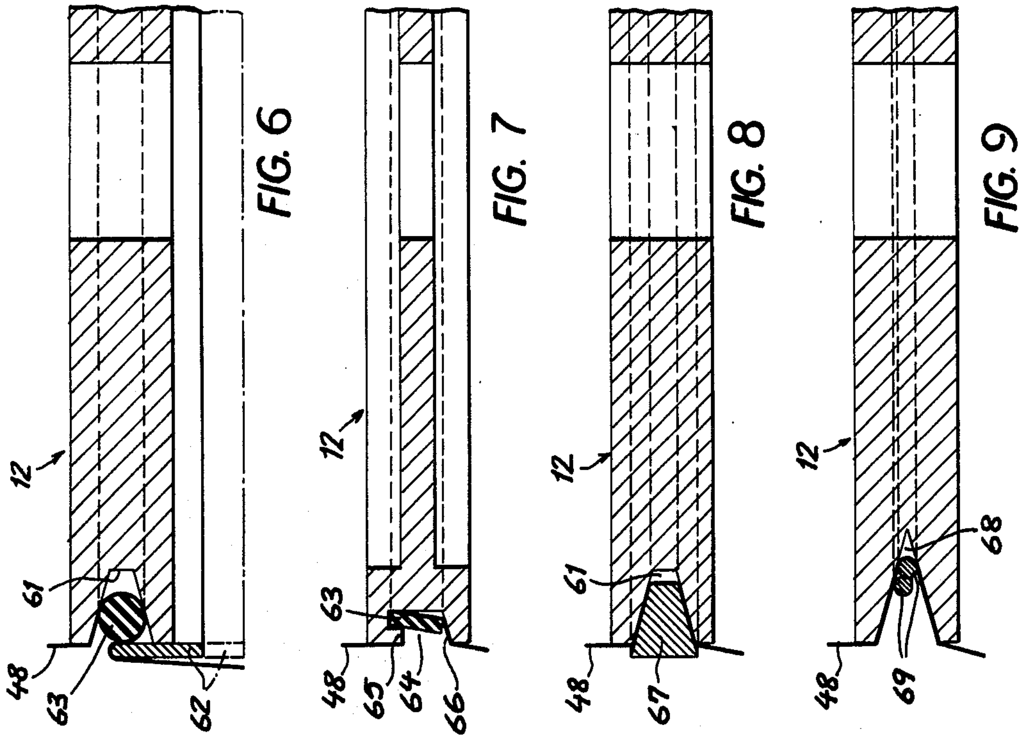
FIGS. 5–9 are diagrammatic partial cross-sectional views showing five other embodiments of means for clamping the fabric of the shade in accordance with other feature of the invention.

In FIG. 6, the pulley 12 has a trapezoidal groove 61 and is provided with a ferrule 62 which can be displaced axially between the dot-dash and solid-line positions shown. In the solid-line position, the ferrule 62 partially blocks the mouth of the groove 61 and prevents withdrawal of a ring 63 of elastic material which retains the fabric in the groove 61. The ring 63 has a circular cross section and clamps the fabric 48 between itself and the flanks of the groove 61. As shown in FIG. 6, when the ferrule 62 is raised into its solid-line position, it prevents withdrawal outwardly of the ring 63 under the tension applied to the fabric 48. A similar device, inversely oriented, can be provided above the cleat support.

In the embodiment of FIG. 7, the peripherally grooved wheel 12 has a groove 64 which is provided with a step or shoulder 65, the flank 66 of this groove opposite the shoulder being inclined as shown in the drawing. A ring 63 is received in this groove and consists of an elastic material of elongated cross section, preferably rectangular. An edge of this ring thus engages beneath the shoulder 65 while the other extremity rides upon the inclined flank 66. The fabric 48 is introduced into the groove 64 under the ring 63. During the application of tension to the fabric, the traction upon the fabric 48, exerted upwardly, provides a selflocking of the fabric because of this configuration.

The embodiment of FIG. 8 uses, as is the case with FIG. 6, a simple peripherally grooved pulley 12 having a trapezoidal groove 61. However, in place of the elastic ring 63, the clamping means is constituted by a belt 67 of trapezoidal cross section which is received in the groove 61 and is of complementary profile to clamp the fabric 48 within this groove. The belt 67 is provided, at its extremities, with a strap and buckle, not shown, which permits closing of the ends of the belt to retain the fabric in the groove.

In the embodiment of FIG. 9, the V-cross section groove 68 provided in the pulley 12 receives one or more turns of a cable 69. The cable is then tightened on itself by conventional means not shown.

What is claimed is:

1. An apparatus for securing a fabric covering to a lampshade frame which comprises:

a support arm;

a first circular member mounted on one end of said support arm;

a shaft axially shiftable through said first member;

a second circular member mounted on said shaft, said second member being provided with a plurality of pivotal cleats adapted to support an upper ring of said frame, a lower ring of said frame resting upon said first member, said rings being interconnected by struts;

respective means for retaining upper and lower ends of a fabric sleeve against said first and second members, said sleeve surrounding said frame upon retention of said ends against said first and second members; and means for displacing said shaft to shift said second member away from said first member and stretch the fabric of said sleeve.

2. The apparatus defined in claim 1 further comprising a support, means for mounting said support arm swingably about a horizontal axis at the opposite end of said support arm, and means at said support opposite end of said support arm for locking same in selected angluar positions.

3. The apparatus defined in claim 1 wherein said support arm is provided at said one end with a split sleeve, a bushing rotatably received in said split sleeve and carrying said first member, said split sleeve forming means for locking said bushing against rotation.

4. The apparatus defined in claim 3, further comprising a tubular slide received in said bushing and axially shiftable therein, said slide being connected with said bushing for rotation therewith, said slide being traversed by said shaft and being connected to said means for axially displacing said shaft.

5. The apparatus defined in claim 4 wherein said slide is formed with at least one notch receiving a pin traversing said shaft for the joint rotation of said shaft and said slide, said shaft being formed with a plurality of holes selectively receiving said pin for adjusting the spacing between said members.

6. The apparatus defined in claim 4 wherein the means for displacing said shaft comprises a pneumatic cylinder pivotally connected to said arm at an end thereof remote from said one end, a lever connected to said cylinder and fulcrummed on said arm and a link connected to said lever, said slide being journaled in a bearing and said link being connected to said bearing to axially displace said slide while enabling rotation thereof relative to said link in said bearing.

7. The apparatus defined in claim 6 wherein said slide is provided with means cooperating with said arm for locking said slide against axial displacement relative to said bushing.

8. The apparatus defined in claim 1 wherein said second member comprises a central hub secured to said shaft, said cleats being pivotally mounted on said hub and extending radially therefrom, said cleats being formed with bifurcated extremities straddling said struts, said upper ring resting upon said cleats.

9. The apparatus defined in claim 5 wherein said hub is provided with an eye having a rod coaxial with said shaft, a further sleeve axially shiftable along said rod, and respective cables connecting said further sleeve with each of said cleats to enable the inward tilting of said cleats upon axial displacement of said sleeve.

10. The apparatus defined in claim 1 wherein each of said members is elastic and the respective end of said fabric is retained against the respective member by a rigid ring.

11. The apparatus defined in claim 1 wherein each of said members is rigid and said fabric is retained against the respective members by a respective rigid ring.

12. The apparatus defined in claim 1 wherein at least one of said members is formed as a pulley having a grooved periphery, the respective fabric end being retained in the groove of said periphery by a respective retaining element.

13. The apparatus defined in claim 12 wherein said retaining element is a cable adapted to be wrapped a plurality of times in said groove.

14. The apparatus defined in claim 12 wherein said retaining element is a ring of circular cross section, said one of said members being provided with an annular ferrule axially shiftable on said one of said members to retain said retaining element in said groove.

15. The apparatus defined in claim 12 wherein said retaining element is a ring of frustoconical cross section.

16. The apparatus defined in claim 12 wherein one of said members is formed with a frustoconical periphery cooperating with a retaining ring.

17. The apparatus defined in claim 16 wherein said retaining ring is of circular cross section.

18. The apparatus defined in claim 16 wherein said retaining ring is of trapezoidal cross section.

* * * * *